UNITED STATES PATENT OFFICE.

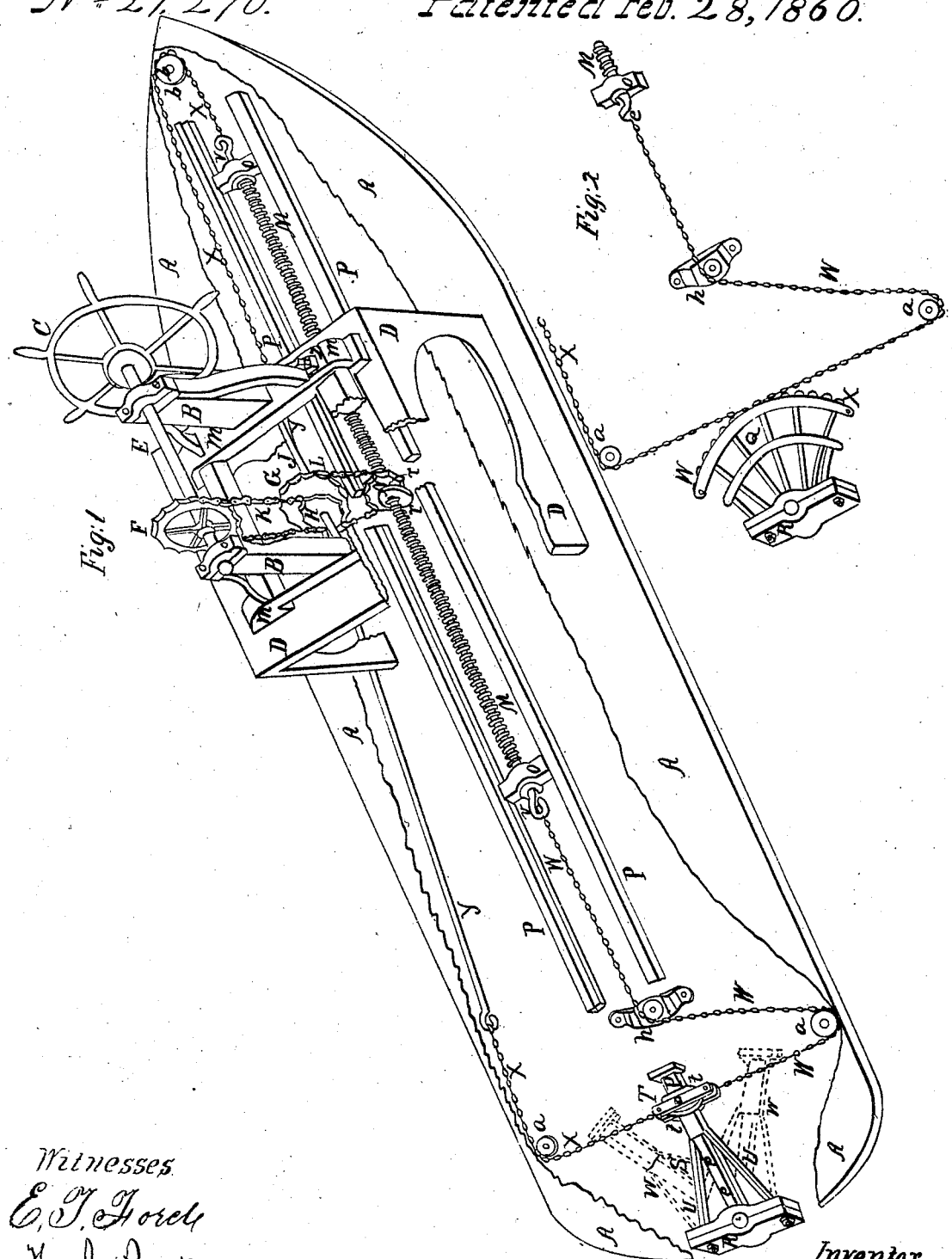

J. THEODORE CHABOT, OF BUFFALO, NEW YORK.

STEERING APPARATUS.

Specification of Letters Patent No. 27,270, dated February 28, 1860.

*To all whom it may concern:*

Be it known that I, J. THEODORE CHABOT, of Buffalo, in the county of Erie, in the State of New York, have invented new and useful Improvements in Steering Apparatus in Controlling Vessels; and I do hereby declare that the following is a full, clear, and exact description of the construction and operation of the same, reference being had to the annexed drawings, making a part of this specification, in which—

Figure 1, is a top perspective view, Fig. 2, a detached section, illustrating the connection of the screw to the tiller Q by means of the chains X and W, like letters referring to like parts in the drawing.

The nature of my invention consists in the manner and arrangement of connecting the steering shaft E of wheel C to a double thread screw tiller, by means of the chain wheels F G, H, and N, the latter wheel N performing the duty of a nut to the screw M, also by the endless chains K, and L.

To enable others skilled in the art to make and use my invention I will proceed to describe its arrangement and operation, as seen in Fig. 1.

The steering wheel C and shaft E are located within the bearings of the standards B, B, erected upon the frame m, and frame m in the pilot house D, D; the same together are located upon deck A of vessel. The steering wheel C and chain wheel F are inserted upon the upper shaft E, and the wheel F is connected to the lower shaft J, by the endless chain K, encompassing the wheel H, which is also located upon the lower shaft J, together with the larger chain wheel G, and the larger wheel G is connected to the smaller wheel N; by the endless chain L, a thread is cut within the smaller wheel N encompassing and corresponding to the thread of screw M. The diameter of the smaller chain wheels N and H, are equal as well as the larger chain wheels G, and F. A portion of the deck A of vessel, is left off in the drawing as well as the frame of pilot house D, in order to present the connection and arrangement of the whole steering apparatus. The screw M, is retained to the slides or ways P, P, by the two cross heads o, o, and which are united to each end of the screw M; the extremities of cross heads o, o, moving horizontally with screw M and parallel with the deck of vessel upon the flanges of slides P, P.

Orifices are made within each extremity of the screw M; for the reception of the screw swivels v v, to which the chains W and X are united, thereby effecting the connection to the screw M. An open box r, encompasses the chain wheel N or nut and the screw M; to be used in retaining the wheel N or nut, upon a perpendicular line with the chain wheel G, the open box r; is made fast to the deck of vessel. The chain X, is attached to the forward screw swivel v extending forward and around the stationary pulley or sheave b; from thence extending to the rear diagonally to, and around the rear sheave a, at the left, at right angle passing to, and united to the straps T, that encompasses the forward end of straight tiller s. The chain X may be substituted in part at the center by the rod y. The rear chain W, is united to the rear extremity of screw M; and extending to the rear, passing over the stationary sheave h, from thence to the right, and around the stationary pulley a; at right angle to; and attached to the right extremity of straps T, of tiller S.

The links of the endless chains K and L, are of equal length, and the circumference of the chain wheels F, H, G, N, are so formed to the irregular surface of the chains, as to prevent the same from slipping in their revolution, as illustrated in Fig. 1.

Operation: By turning the steering wheel C right and left, the screw M is made to revolve correspondingly by its connection with the chains K and L, encompassing the wheels F G, H, and N, the screw M also moving horizontally also moving the tiller S right and left or tiller Q, as indicated by the dotted lines w, w, in Fig. 1.

The screw swivels r, r, of screw M are used for taking in slack chain. I do not claim the screw endless chains and wheels separately.

What I claim as my invention and desire to secure by Letters Patent is—

The combination and arrangement of the steering wheel C, chain wheels F, G, H, N; double thread screw M, endless chains K, L, and screw swivels v v; and as connected to tiller, substantially for the purpose specified.

J. THEODORE CHABOT.

Witnessed in presence of—
  E. T. FORD,
  H. B. BURT.